United States Patent
Taillefer et al.

(10) Patent No.: US 7,610,578 B1
(45) Date of Patent: Oct. 27, 2009

(54) TEST MANAGER FOR INTEGRATED TEST ENVIRONMENTS

(75) Inventors: Greg Taillefer, Wrentham, MA (US); David Karl Critz, Boston, MA (US)

(73) Assignee: The Math Works, Inc., Natick, MA (US)

(*) Notice: Subject to any disclaimer, the term of this patent is extended or adjusted under 35 U.S.C. 154(b) by 863 days.

(21) Appl. No.: 10/925,413

(22) Filed: Aug. 24, 2004

(51) Int. Cl.
*G06F 9/44* (2006.01)

(52) U.S. Cl. ........................................ 717/124; 717/125
(58) Field of Classification Search .......... 717/124–126
See application file for complete search history.

(56) References Cited

U.S. PATENT DOCUMENTS

| | | | | |
|---|---|---|---|---|
| 5,490,249 | A * | 2/1996 | Miller | 714/38 |
| 5,530,861 | A * | 6/1996 | Diamant et al. | 705/8 |
| 5,598,564 | A * | 1/1997 | Barker, III | 717/126 |
| 5,940,586 | A * | 8/1999 | Bealkowski et al. | 714/5 |
| 6,577,981 | B1 * | 6/2003 | Grey et al. | 702/119 |
| 6,912,522 | B2 * | 6/2005 | Edgar | 707/2 |
| 6,915,455 | B2 * | 7/2005 | Jones et al. | 714/38 |
| 6,978,440 | B1 * | 12/2005 | Pavela | 717/125 |
| 6,993,747 | B1 * | 1/2006 | Friedman | 717/124 |
| 7,139,999 | B2 * | 11/2006 | Bowman-Amuah | 717/101 |
| 7,209,851 | B2 * | 4/2007 | Singh et al. | 702/119 |
| 7,222,265 | B1 * | 5/2007 | LeSuer et al. | 714/38 |
| 7,231,337 | B1 * | 6/2007 | Karchmer et al. | 703/15 |
| 7,266,808 | B2 * | 9/2007 | Kolawa et al. | 717/126 |
| 7,421,683 | B2 * | 9/2008 | Robertson et al. | 717/130 |
| 7,490,319 | B2 * | 2/2009 | Blackwell et al. | 717/124 |
| 2002/0166062 | A1 * | 11/2002 | Helbig, Sr. | 713/200 |
| 2003/0036866 | A1 * | 2/2003 | Nair et al. | 702/81 |
| 2003/0192029 | A1 * | 10/2003 | Hughes | 717/101 |
| 2004/0016002 | A1 * | 1/2004 | Handelman et al. | 725/152 |
| 2004/0047356 | A1 * | 3/2004 | Bauer | 370/401 |
| 2004/0153830 | A1 * | 8/2004 | Cebula et al. | 714/38 |
| 2004/0167749 | A1 * | 8/2004 | Friedman et al. | 702/186 |
| 2004/0210866 | A1 * | 10/2004 | Friedman et al. | 717/106 |
| 2005/0027846 | A1 * | 2/2005 | Wolfe et al. | 709/223 |

OTHER PUBLICATIONS

Barriocanal et al. "An Experience in Integrating Automated Unit Testing Practices in an Introductory Programming Course", Dec. 2002 ACM SIGCSE Bulletin vol. 34 Issue 4, pp. 125-128.*

Miller et al. "A Framework and Tool Support for the Systematic Testing of Model-Based Specifications", Oct. 2003, ACM, TOSEM vol. 12, Issue 4, pp. 409-439.*

(Continued)

*Primary Examiner*—Anna Deng
(74) *Attorney, Agent, or Firm*—Lahive & Cockfield, LLP; Kevin J. Canning

(57) ABSTRACT

Methods are provided to automatically generate, distribute and execute code locally and remotely. The test may therefore be performed using the automatically distributed code. Automated parameter mapping may be provided to couple parameters applicable to a test step with the test step. A test step in the test may therefore automatically include the coupled parameters. Data storage may be performed using a multidimensional parametric space. Each point in space may contain arbitrary nonscalar data which define an individual data workspace. These points can also be plotted against each other and overlayed to aid in visualization of multi-dimensional data.

62 Claims, 10 Drawing Sheets

OTHER PUBLICATIONS

Olan et al. "Dr. J Vs. The Bird: Java IDE'S One-on-One", May 2004, Consortium for Computing Sciences in Colleges, Journal of Computing Sciences in Colleges, vol. 19, Issue 5, pp. 44-52.*

National Instruments, "SignalExpress™—Getting Started with SignalExpress," Aug. 2004 Edition, 38 pages.

* cited by examiner

US 7,610,578 B1

TEST MANAGER FOR INTEGRATED TEST ENVIRONMENTS

FIELD OF THE INVENTION

The present invention relates generally to interactive test environments and more particularly to a test manager that enables users to conduct a test in the interactive test environments.

BACKGROUND OF THE INVENTION

Computers may include software tools that provide programming environments. The software tools enable users to create programs that can be executed on the computers. The software tools may provide textual and graphical environments for generating the programs. MATLAB® and Simulink®, both from The MathWorks Inc. of Natick, Mass., are exemplary software tools that provide textual and graphical programming environments, respectively. Computers may also include software tools that provide other functions, such as reading/writing data from/to external devices. MATLAB® Toolboxes, from The MathWorks Inc. of Natick, Mass., provide exemplary software tools that enable the computers to perform a plurality of functions, including interfacing with the external devices.

Programs generated by users using the software tools, such as MATLAB® and Simulink®, need to be tested to check whether the programs operate properly as designed. Also, functions developed for software tools, such as MATLAB® Toolboxes, need to be tested to check whether the functions are properly performed in a given setting. Furthermore, the data produced in the execution of the test needs to be stored and often viewed and manipulated in a test environment. Therefore, there is a need in the art to provide an integrated test environment in which the users and developers of software tools are able to conduct a test for testing programs and various functions of software tools, and manipulate the output data of the test, including graphical displays of the output data.

SUMMARY OF THE INVENTION

The present invention provides test environments for testing units under test. The present invention provides integrated test environments for testing various types of units under test. The units under test may include textual or graphical programs generated by users using programming software tools. The programs may include, for example, code or models. The programs or parts of the programs may be tested to check whether the programs work as designed. The units under test may also include functions provided in the software tools, such as data transferring from/to external devices. The functions provided by the software tools may be tested to check whether the function is properly performed in different settings. Units under test may also include hardware devices.

The test environments of the present invention enable the users to edit the test for testing the various types of units under test. The user may edit the sequence of the test. The users may also input the variables and parameters of the test for testing the units under test in different conditions. According to an illustrative embodiment of the present invention, the output data of the test may be stored in a multidimensional parametric space. Each point in the multidimensional parametric space may be plotted against each other and overlayed to aid in visualization of multi-dimensional data.

In an aspect of the present invention, a method is provided for conducting a test for testing units under test in a test environment. Users are able to edit the test to include one or more test steps for testing the units under test in the test environment. Code for the test is generated and executed to produce output data of the test in the test environment.

In another aspect of the present invention, a system is provided for conducting a test for testing units under test. The system includes a user interface for enabling users to edit the test to include one or more test steps for testing the units under test. The system also includes a process for generating code for the test. The system further includes a software tool for executing the code to generate output data of the test.

In another aspect of the present invention, a test manager is provided for a test environment. The test manager includes a user interface for enabling users to edit a test to include one or more test steps for testing units under test. The test manager also includes a process for generating code for the test. The test manager further includes a dataset for storing output data of the test generated from an execution of the code for the test.

In another aspect of the present invention, a medium is provided for holding computational device executable steps for a method. The method includes the step of enabling users to edit the test to include one or more test steps for testing the units under test in the test environment. The method also includes the step of generating code for the test. The method further includes the step of executing the code to produce output data of the test in the test environment.

BRIEF DESCRIPTION OF THE DRAWINGS

The aforementioned features and advantages, and other features and aspects of the present invention, will become better understood with regard to the following description and accompanying drawings, wherein.

DETAILED DESCRIPTION

The illustrative embodiment of the present invention provides a test environment in which the users (or developers) of software tools are able to conduct a test for testing various types of units under test. In the illustrative embodiment, the units under test may include textual or graphical programs generated by users using programming software tools. The programs may include code and models. The units under test may also include functions, such as data transferring from/to external devices, provided in the software tools. The units under test may further include hardware devices.

The illustrative embodiment of the present invention provides a test environment that enables users to edit the test for testing the various types of units under test. The test may include one or more test steps, such as a test step for testing a textual program, a test step for testing a graphical program, a test step for testing a function provided in a software tool, a test step for testing a hardware device, etc. The users may edit the sequence of the test steps in the test. The users may also input the variables and parameters of the test for running the test in different conditions.

The illustrative embodiment of the present invention automatically generates code for the test and executes the code locally and/or remotely. The code may be distributed to one or more remote computational devices for the distributed execution of the test. In the execution of the code for the test, automated parameter mapping may be provided to couple parameters applicable to a test step with the test step. A test step in the test therefore may automatically include the coupled parameters. The test results may be stored in a dataset configured to have a multidimensional space. Each point in the multidimensional space may contain arbitrary nonscalar data which defines an individual data workspace. These points can also be plotted against each other and overlayed to aid in the visualization of the multidimensional data.

Figure 1:
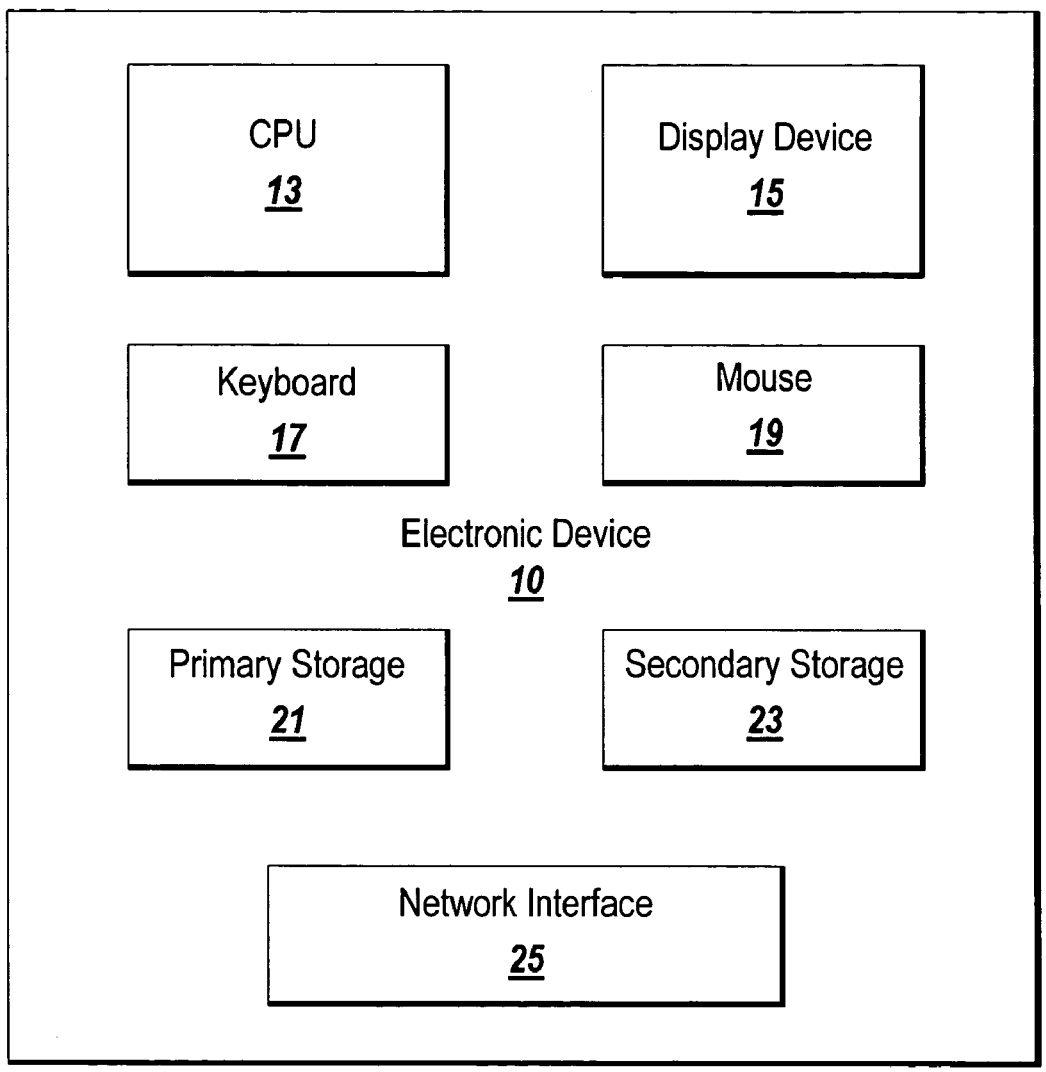
FIG. 1 is a computational device suitable for practicing the illustrative embodiment of the present invention.

FIG. 1 shows an exemplary computational device 10 suitable for practicing the illustrative embodiment of the present invention, which may provide a test environment. The computational device 10 is representative of a number of different technologies, such as mainframes, personal computers (PCs), laptop computers, workstations, personal digital assistants (PDAs), quantum computers, optical computers, bio computers, Internet appliances, cellular telephones, and their combinations. One of ordinary skill in the art will appreciate that the computational device 10 is intended to be illustrative and not limiting of the present invention.

In the illustrated embodiment, the computational device 10 may be electronic and includes a central processing unit (CPU) 13 and a display device 15. The display device 15 enables the computational device 10 to communicate directly with a user through a visual display. The computational device 10 may further include a keyboard 17 and a mouse 19. Other potential input devices not depicted include a stylus, trackball, joystick, touch pad, touch screen, and the like. The computational device 10 may also include a network interface 25 for communicating with one or more computational devices external to the computational device 10 through communication networks, such as Internet, intranet, LAN (Local Area Network), WAN (Wide Area Network) and MAN (Metropolitan Area Network). A modem (not shown) may be one form of establishing a connection with an external computational device or network. The communication facilities support for the distributed execution of the test.

The CPU 13 may have coupled thereto one or more of the aforementioned components, either internally or externally. The CPU 13 controls each component of the computational device 10 to provide the test environment. The computational device 10 may include primary storage 21 and/or secondary storage 23 for storing data and instructions. The storage devices 21 and 23 can include such technologies as a floppy drive, hard drive, tape drive, optical drive, read only memory (ROM), random access memory (RAM), and the like. Applications such as browsers, JAVA virtual machines, and other utilities and applications can be resident on one or both of the storage devices 21 and 23. JAVA is available from Sun Microsystems, Inc. of Santa Clara, Calif. In particular, the storage devices 21 and 23 may include code for applications providing the test environment, and for other software tools, such MATLAB®, Simulink®, MATLAB® Toolboxes, and Simulink® Blocksets, all from The MathWorks, Inc. of Natick, Mass., which will be described below in more detail.

Figure 2A:
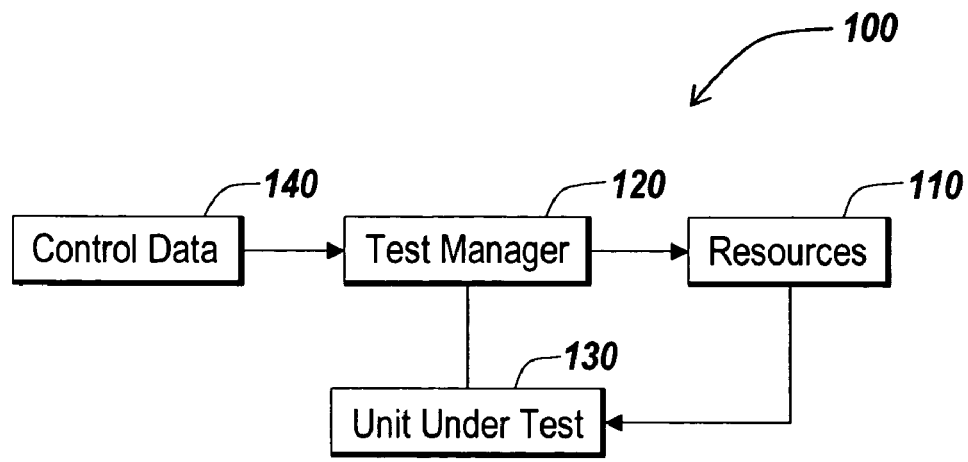
FIG. 2A is an example of a test environment that may be implemented in the illustrative embodiment of the present invention.

FIG. 2A is an example of a test environment 100 provided in the illustrative embodiment of the present invention. In the test environment 100, various types of resources 110 may be used for testing units under test 130. One of skill in the art will appreciate that the resources 110 may include software tools and hardware tools. The resources 110 are described below in more detail with reference to FIG. 2B. The test environment 100 includes a test manager 120. Using the test manager 120, users may input control data 140 for setting conditions for testing the units under test 130 in the test environment 100. The control data 140 may include a sequence of test steps that specifies the ordering of the resources to be used by the test manager 120. The users may also input the variables and parameters of the test that can be used as arguments to call the functions provided by the resources 110. Using different variables and parameters in the test, the functions of the units under test 130 may return different values. The units under test 130 may include one or more pieces of hardware, software and/or programs, such as models and/or code. One of skill in the art will appreciate that the units under test 130 may include software tools and hardware tools.

Figure 2B:
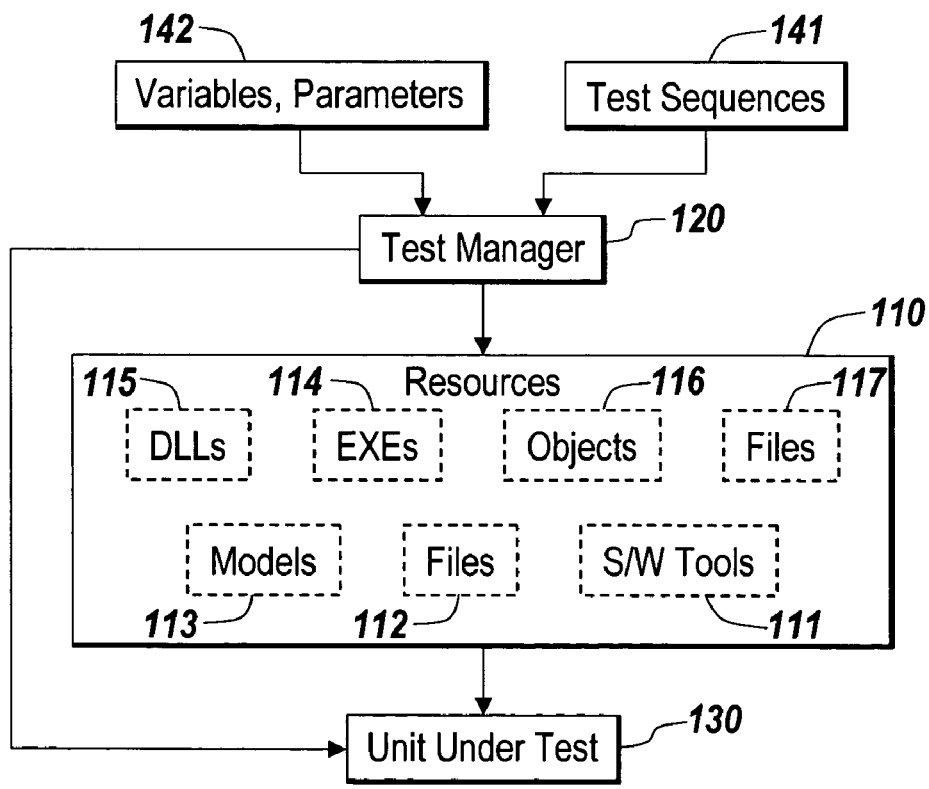
FIG. 2B shows the details of the test environment in the illustrative embodiment of the present invention depicted in FIG. 2A.

FIG. 2B shows details of the exemplary test environment 100 depicted in FIG. 1. The resources 110 may include software tools 111, such as MATLAB®, Simulink®, MATLAB® Toolboxes, and Simulink® Blocksets. The resources 110 may also include m-files 112, models 113, executable code (EXE) 114, dynamic linked libraries (DLLs) 115, COM objects 116, and/or files 117. One of skill in the ordinary art will appreciate that the examples depicted in FIG. 2 are illustrative and the resources 110 may include other software tools.

MATLAB® is an intuitive language and provides a technical computing environment. The MATLAB® environment integrates mathematical computing, visualization, and a powerful technical language. MATLAB® provides core mathematics and advanced graphical tools for data analysis, visualization, and algorithm and application development. MATLAB® provides a range of computing tasks in engineering and science, from data acquisition and analysis to application development. Built-in interfaces of MATLAB® enable users to access and import data from instruments, files, and external databases and programs. In addition, MATLAB® enables the users to integrate external routines written in C, C++, Fortran, and Java with the MATLAB® applications. The test environment 110 enables users to test files generated using MATLAB®.

MATLAB® Toolboxes include a plurality of Toolboxes, such as Instrument Control Toolbox. The Instrument Control Toolbox provides communications with instruments, such as oscilloscopes and function generators, directly from MATLAB. Instrument Control Toolbox supports for GPIB, VISA, TCP/IP, and UDP communication protocols. Users may generate data to send out to an instrument, or read data for analysis and visualization. The transferred data can be binary or ASCII. The Instrument Control Toolbox supports both synchronous and asynchronous read and write functions. A synchronous operation blocks access to the command line until the read or write is completed. An asynchronous operation does not block access to the command line, and additional MATLAB® commands can be issued while the read or write operation executes. The test environment 110 enables users to test functions provided by MATLAB® Toolboxes in a given condition.

Simulink® enables users to design block diagrams for target systems, simulate the systems' behavior, analyze the performance of the systems, and refine the design of the systems. Simulink® provides block diagram environments that allow users to draw, edit, annotate, save, and print out the block diagrams of the target systems. Simulink® provides a graphical user interface (GUI) component that allows drafting of block diagram models by users. The visual representation of the target systems in the block diagrams allows for a convenient interpretation of the target systems and provides an intuitive notion of the behavior of the target systems. Simulink® also allows users to simulate the designed target systems to determine the behavior of the systems. The test manager 120 provides a test environment 110 that enables users to test model files generated using Simulink®.

Simulink® Blocksets contain application specific blocks that support the modeling and simulation of systems in the block diagram environment provided by Simulink®. Simulink® Blocksets provide blocks that are incorporated into the models of the systems, and include subsets, such as Fixed-point Blockset and Communications Blockset, from The MathWorks, Inc. of Natick, Mass. The Blocksets provide utilities for the development and integration of models for the systems and sub-systems of the systems. The test environment 110 enables users to test a block or blocks provided by Simulink® Blocksets.

The illustrative embodiment of the present invention provides an integrated test environment in which the users (or developers) of software tools are able to conduct a test for testing various types of units under test 130. The test may include one or more test steps, such as a test step for testing a textual program, a test step for testing a graphical program, a test step for testing a function provided in a software tool, a test step for testing a hardware device, etc. As an example, the test includes a MATLAB® step in which MATLAB® expressions can be executed. The MATLAB® step communicates with MATLAB® installed locally or in a remote computational device to run the expression and returns the result to the test manager 120. The test steps may also include a Simulink® step to interact with models, and an Instrument Control (one of MATLAB® Toolboxes) step to interact with external hardware. Furthermore, a Statistics Toolbox (one of MATLAB® Toolboxes) step may provide statistical analysis for data procured by other steps. The test steps in the test include discrete actions that are executed during the execution of the test. The test step and test step properties may be deemed a Java function call that generates M-code, and the function call arguments, respectively.

The test manager 120 may receive control data, such as the sequence 141 of the test steps and the variables and parameters 142 of the test, for building and running the test. The test manager 120 conducts the test in different conditions using the sequence 141 of the test steps and the variables and parameters 142 of the test. The test manager 120 may provide user interfaces that enable the users to input the data for the sequence 141 of test steps. The user interfaces may also enable users to input data for the variables and parameters 142 of the test steps. The test manager 120 will be described below in more detail with reference to FIG. 2C.

Figure 2C:
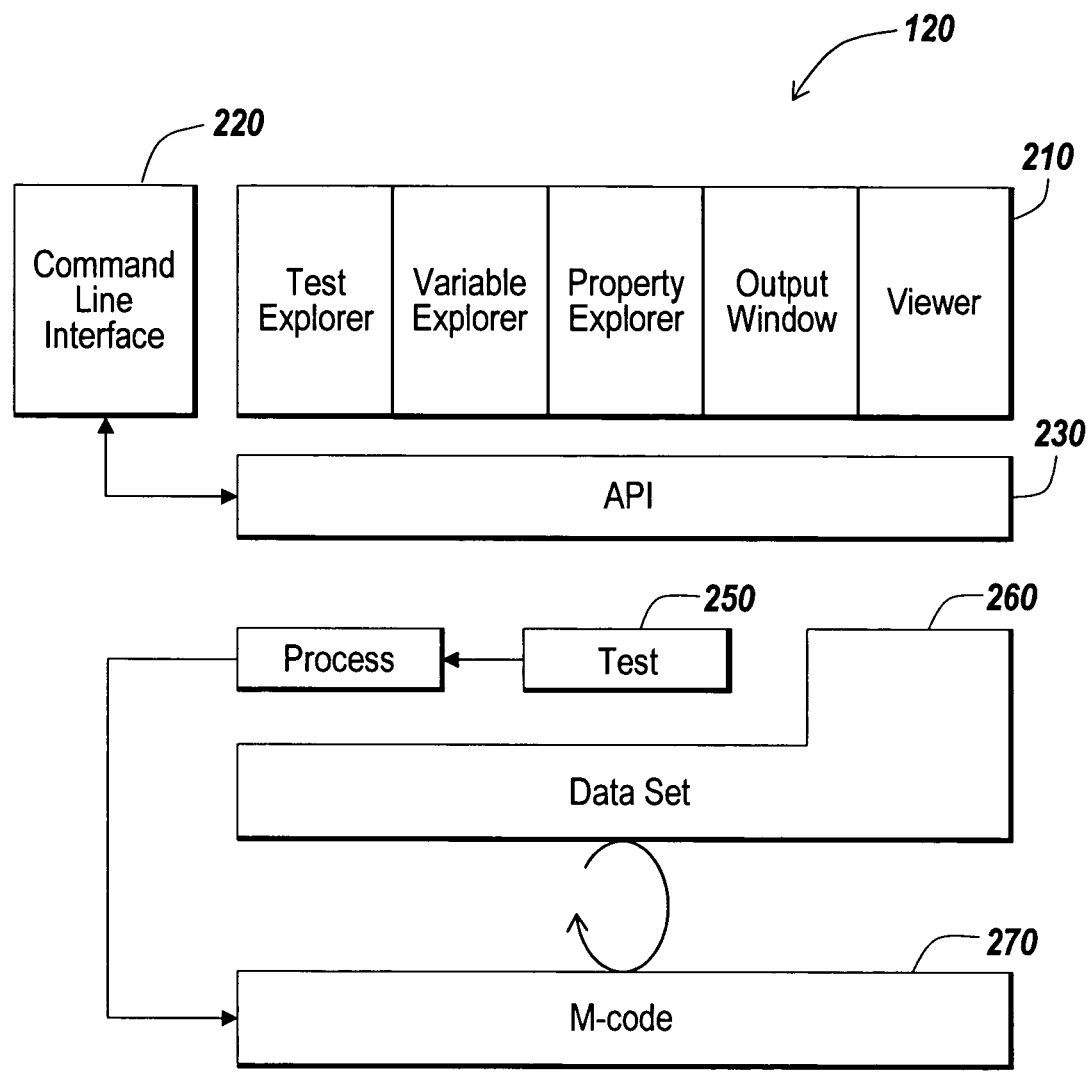
FIG. 2C is a block diagram showing an exemplary architecture of the test manager depicted in FIGS. 2A and 2B.
Figure 7:
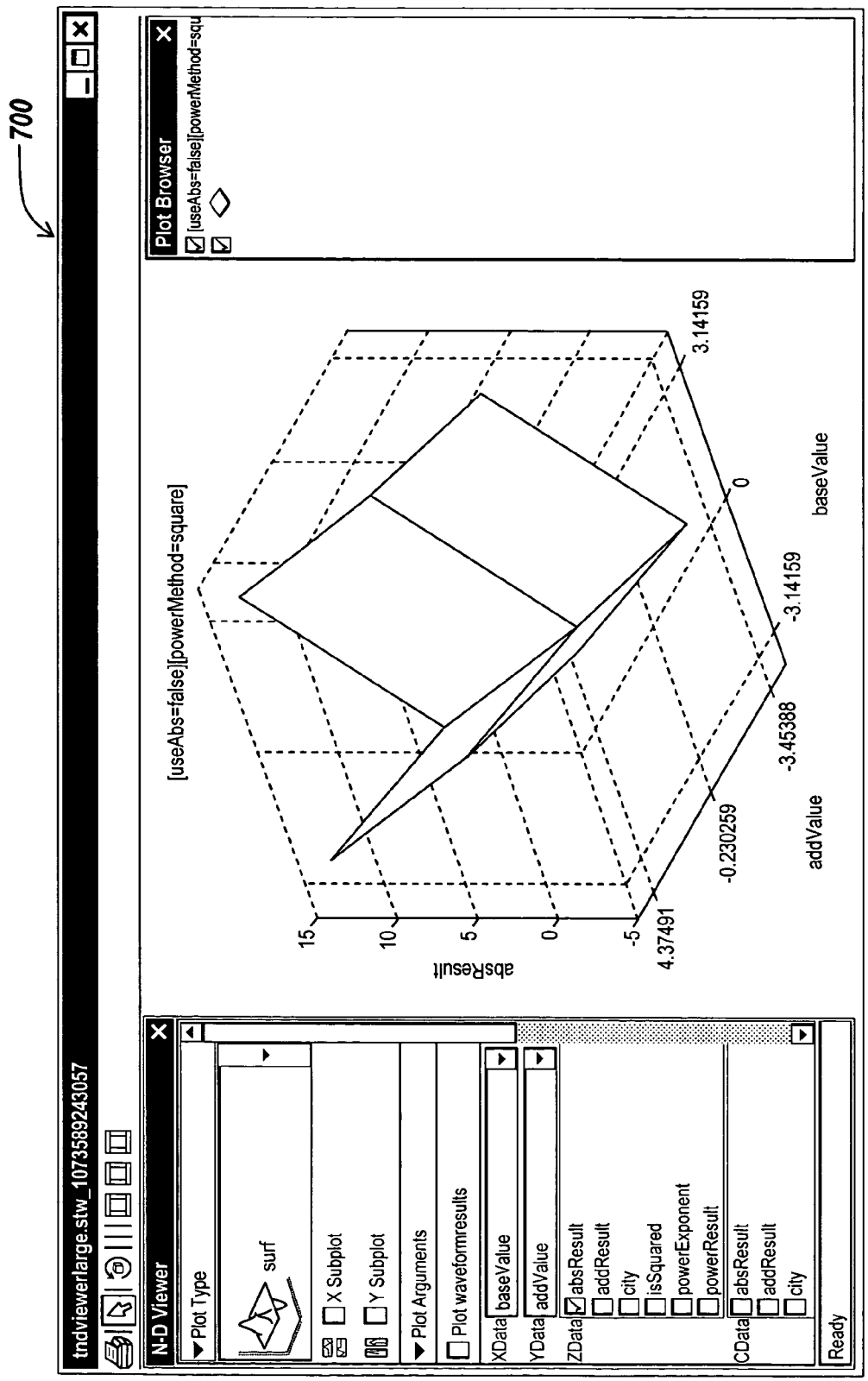
FIG. 7 is an example of a graph window according to the illustrative embodiment of the present invention.

FIG. 2C is a block diagram showing an exemplary architecture of the test manager 120 depicted in FIGS. 2A and 2B. The test manager 120 includes graphical user interfaces (GUIs) 210, a command line interface (CLI) 220, an application programming interface (API) 230, a process 240, a test 250, a dataset 260, and M-code 270 for the test 250. The test manager 120 enables the users to build and run the test 250. The test 250 may include test steps for testing various types of units under test 130, as described above with reference to FIGS. 2A and 2B. Users may build and run the test 250 using the GUIs 210. The GUIs 210 may include Test Explorer, Variable Explorer, Properties Explorer for building the test 250. The GUIs 210 enable the users to edit the sequence of the test steps in the test and to input the variables and parameters of the test. The GUIs 210 may also include Output Window and Viewer for monitoring the execution of the test 250 and for viewing the output of the test, respectively. The GUIs 210 will be described below in more detail with reference to FIGS. 4, 5 and 7. Users may build and run the test 250 using the CLI 220, such as a MATLAB command line interface, as well as the GUIs 210. The GUIs 210 and CLI 220 enable the users and/or developers of software tools to edit and run the test, and to manipulate the output data of the test. The test manager 120 also provides API 230 for the developers of software tools to hook up their software tools to the test manager 120. The API 220 is a set of rules for writing function or subroutine calls that access the functions in the software tools. The test manager 120 may use these rules or function calls to communicate with the software tools. For example, the API 220 may enable the test manager 120 to control the software tools, including setting variables of the functions in the software tools. The API 230 facilitates adding test steps for testing newly developed software tools, which will be described below in more detail with reference to FIG. 3A.

The test manager 120 includes a code generation process 240 for automatically generating code for the test. In the illustrative embodiment, the test may be coded in MATLAB M-code. One of ordinary skill in the art will appreciate that the test may be coded in different code, such as C-code, in other embodiments. The test manager 120 may include a dataset 260 for storing output data of running the test. The dataset 260 is configured to have a multidimensional space depending on parameters of the test specified by the users. Each point in the space may contain arbitrary scalar and nonscalar data which defines the results from an individual test run using a unique combination of user defined parameters. These points can also be plotted against each other and overlayed to aid in the visualization of the multidimensional data. As the test 250 is executed with specified variables and parameters, each test run returns a result and the output data of each test run is added to the dataset 260. The automatic generation and execution of the code will be described below in more detail with reference to FIG. 6.

Figure 3A:
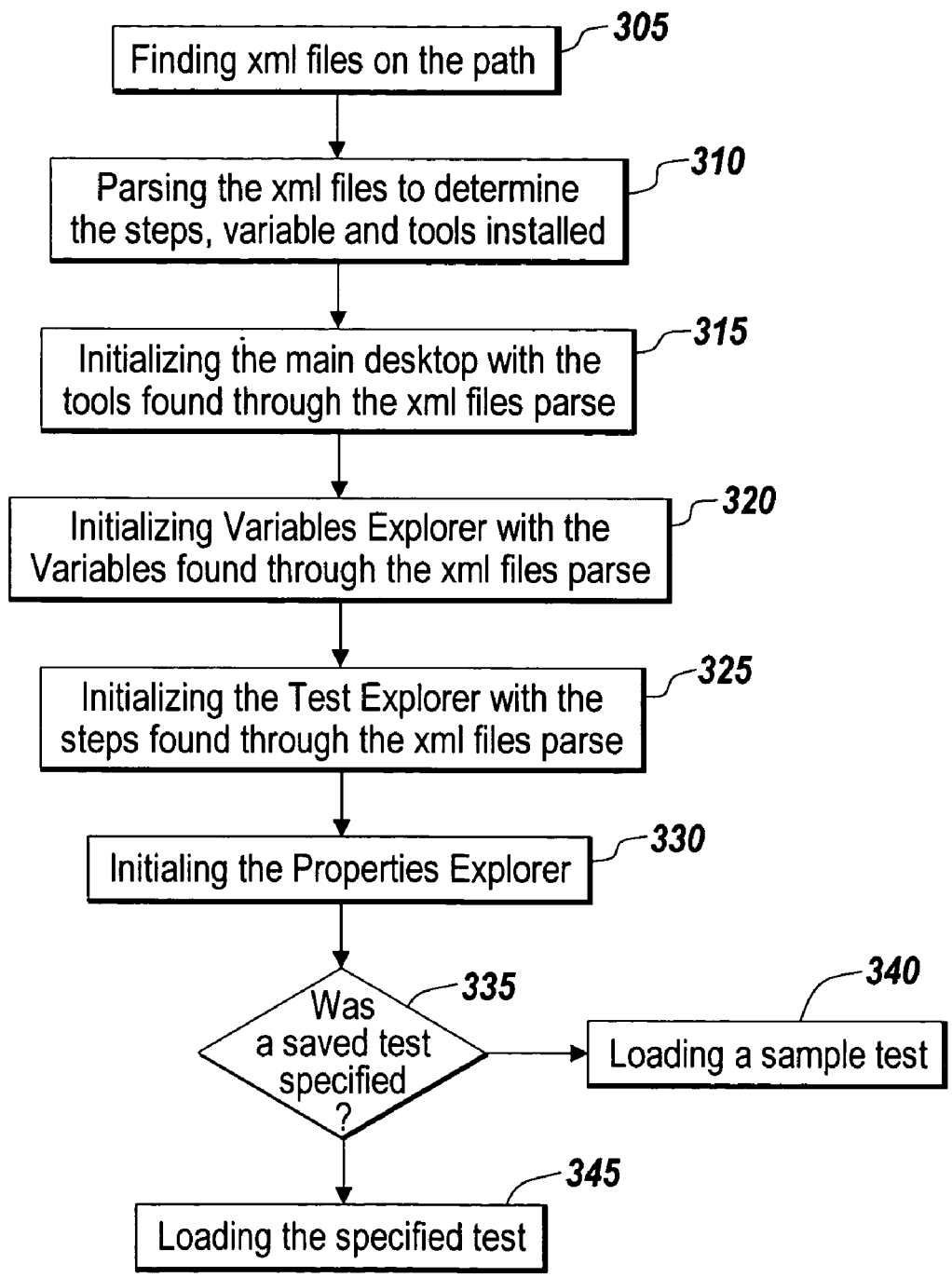
FIG. 3A is a flow chart showing an exemplary operation for loading the test manager to provide the test environment in the illustrative embodiment of the present invention.

FIG. 3A is a flow chart showing an exemplary operation for loading the test manager 120 in the computational device 10. On loading the test manager 120, the test manager 120 finds all of the related info.xml files on the path of the software tools installed in the computational device 10, such as the MATLAB path. (step 305). The info.xml files contain information on the test step types that appear in the steps palette (See, 411 in FIGS. 4 and 5) and information on the variables that appear in the variable palette (See, 431 in FIGS. 4 and 5). An exemplary info.xml file is shown as follows.

```
<tools>
  <tool
  ToolID="TMTOOL"
  Name="Test and Measurement"
  ToolIcon="/com/networks/toolbox/stw/resources/hardware.gif"
  IconOnButtonOnly="true"
```

```
ShortDescription="Configure instruments with Test and
    Measurement Tool"
Command="tmtool"
/>
</tools>
<steps>
<step category="matlab"
class="com.mathworks.toolbox.stw.step.matlab.Matlab
    Step"/>
<step category="simulink"
class="com.mathworks.toolbox.stw.step.simulink.
    SimulinkStep"/>
<step category="instrumentcontrol"
class="com.mathworks.toolbox.stw.step.instrument.step.
    instrread.InstrReadStep"/>
<step category="instrumentcontrol"
class="com.mathworks.toolbox.stw.step.instrument.step.
    Instrwrite.InstrWriteStep"/>
<step category="programcontrol"
class="com.mathworks.toolbox.stw.step.limitcheck.Limit
    CheckStep"/>
<step                     category="programcontrol"
class="com.mathworks.toolbox.stw.step.Ifstep.IFStep"/>
<step category="programcontrol"
class="com.mathworks.toolbox.stw.step.stop.StopStep"/>
<step category="programcontrol"
class="com.mathworks.toolbox.stw.step.setstatus.Set
    StatusStep"/>
<step category="programcontrol"
class="com.mathworks.toolbox.stw.step.Subsequence"/>
</steps>
<variables>
<variable category="matlab"
class="com.mathworks.toolbox.stw.param.variable.
    Variable"/>
<variable category="matlab"
class="com.mathworks.toolbox.stw.param.iparam.
    IParam"/>
</variables>
</stw>
```

The test manager 120 parses the info.xml files to determine what types of test steps, variables and software tools are installed in the computational device 10 (step 310). The exemplary xml file shown above includes information on test steps including MatlabStep SimulinkStep, InstrReadStep, InstrWriteStep, LimitCheckStep, IFStep, StopStep and SetStatusStep, which will appear in the GUI depicted in FIGS. 4 and 5. The exemplary xml file also includes information on variables including Variable and Independent Parameter, which will appear in the GUI depicted in FIGS. 4 and 5. Based on the determination, the test manager 120 initializes the main desktop, menu bar and tool bar with the default layout along with the software tools found through the xml files parse (step 315). The desktop is the main frame that contains other dockable frames, such as Test Explorer, Variable Explorer and Properties Explorer depicted in FIG. 2C. The test manager 120 also initializes Variable Explorer with the variables found through the xml files parse (step 320). The test manager 120 further initializes Test Explorer with the test step types found through the xml files parse (step 325). The test manager 120 initializes Properties Explorer (step 330). Test Explorer, Variable Explorer and Properties Explorer will also be described below in more detail with reference to FIGS. 4 and 5. If a saved test is specified (step 335), the test manager 120 loads the specified test (step 345). If a test is not specified, the test manager 120 loads a sample test (step 340).

The illustrative embodiment provides automatic detection of installed steps, parameters and configuration tools by parsing the info.xml files on loading of the test manager 120. The developers of software tools may provide steps, parameters and other tools with their software tools. The illustrative embodiment will detect such items and register them with the test environment 100. If the developers want their software tools to be tested in the test environment 100, the API 220 enables the users to place an info.xml file in the directory of the users' software tool. The info.xml file contains an entry for the step name and any test variables associated with the users' software tool. This can provide enhanced capability in more easily testing an arbitrary range of items and for very specific and specialized industries.

Figure 3B:
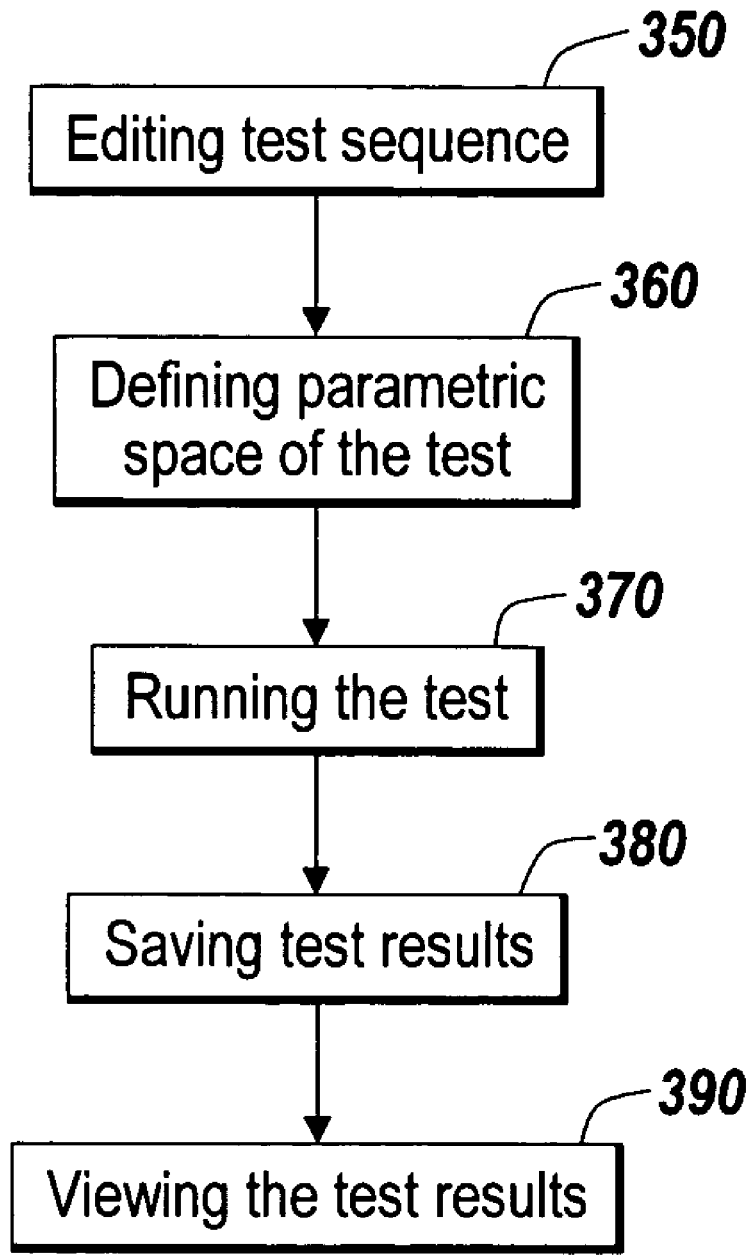
FIG. 3B is a flow chart showing an exemplary operation of the test manager for conducting a test in the test environment.
Figure 4:
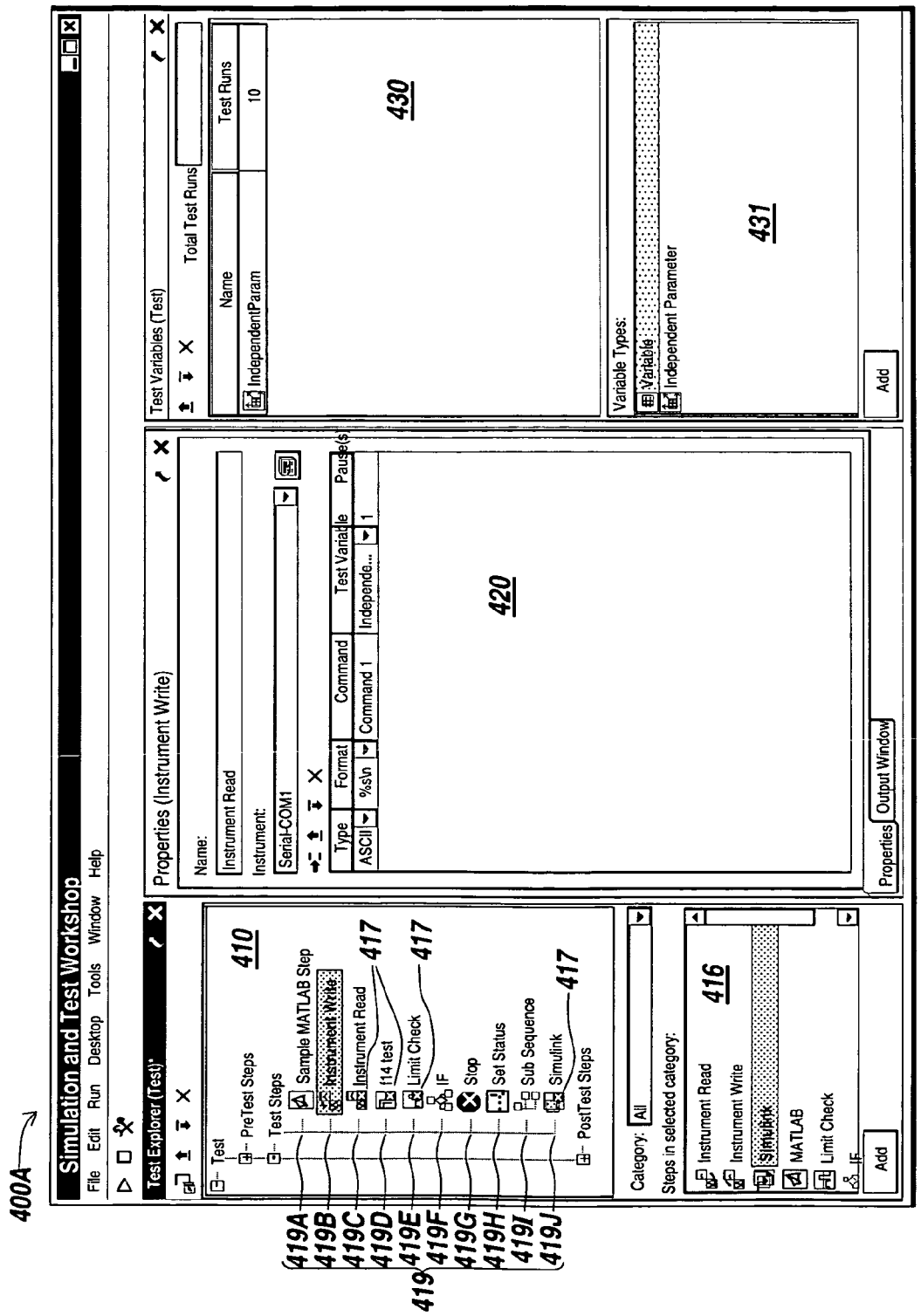
FIGS. 4 and 5 are examples of graphical user interfaces (GUIs) that depict the sequence of test steps in the illustrative embodiment of the present invention.

FIG. 3B is a flow chart showing an exemplary operation of the test manager 120 for conducting a test in the test environment 100. The test manager 120 enables users to edit the test by providing user interfaces, such as the GUIs 210 and CLI 220 (step 350). FIG. 4 is an example of a GUI 400A in an illustrative embodiment of the present invention. The user interface may be displayed on the display device 15. The user interface 400A includes, by way of example, Test Explorer 410, Properties Explorer 420 and Variable Explorer 430. The user interface 400A combines Test Explorer 410, Properties Explorer 420 and Variable Explorer 430 in a window in the illustrative embodiment of the present invention. One of skill in the art will appreciate that Test Explorer 410, Properties Explorer 420 and Variable Explorer 430 may be provided in separate windows.

The user interface may be generated by subclassing a Java desktop class for the four or more desktop clients, i.e., Test Explorer 410, Properties Explorer 420, Parameters Explorer, Variable Explorer 430, Resource Explorer and Output Window. These are mapped via XML (Extensible Mark-up Language) as clients to the desktop. Properties Explorer 420 sheets are produced via abstract factory design pattern. JavaBeans, from Sun Microsystems, Inc, Santa Clara, Calif., may provide the underlying architecture. Test Explorer 410 provides facilities enabling users to edit a sequence of test steps that the users want to be executed in the test environment 100.

The user may select the sequence of test steps using the predetermined test steps provided in the test step palette 416 of Test Explorer 410. The predetermined test steps may be implemented as objects that are the members of classes. The classes have properties and methods that characterize any member (test step) of the classes. The properties of a test step are the data associated with the test step and determine the attributes of the test step. The properties of the test step are described below in more detail with reference to Properties Explorer 420. The predetermined test steps may be compiled into class files and included in the test step palette 416 by XML mapping of the class files to the test step palette 416. The users may select a category of the test steps in the test step palette 416 so that the test steps of the selected category may be provided in the test step palette 416. The users may add one or more of the test steps in the test step palette 416 to the sequence of test steps 419 shown in Test Explorer 410.

The test steps in the test step palette 416 may include Instrument Read, Instrument Write, Simulink®, MATLAB®, Limit Check, IF, Stop, etc. One of skill in the art will appreciate that the test steps shown in the test step palette 416 are illustrative and the test steps may include other test steps necessary for the sequence of test steps in Test Explorer 410. The test steps of Instrument Read and Instrument Write test the operation of reading and writing data from/to external devices, respectively. The test steps of Simulink® and MATLAB® test the program or model files generated in MAT- LAB® and Simulink®, respectively. The test step of Limit Check checks data whether the selected test data points exceed a set limit. If the data exceed the limit, a user-specified action occurs, including Keep Testing, Stop This Test Run, and Stop All Test Runs. Each of the test steps in the test step palette 416 may be added to the sequence of test steps based on the users' selection. In the example shown in FIG. 4, the sequence of test steps includes Sample MATLAB® step 419A, Instrument Write 419B, Instrument Read 419C, f14 Test 419D, Limit Check 419E, IF 419F, Stop 419G, Set Status 419H, Sub Sequence 419I and Simulink® 419J. One of skill in the art will appreciate that the sequence of test steps 419 shown in FIG. 4 is illustrative and different sequences of test steps may be used.

Each test step in the sequence of test steps in Test Explorer 410 is an object with associated properties and a subset of these properties may be displayed on a property sheet, such as those shown in Properties Explorer 420. On the users' selection of a test step in the test, Properties Explorer 420 provides various properties of a selected test step in the test. The properties of the selected test step provided in Properties Explorer 420 include the properties of the selected test step that should be specified in order for the selected test step to be executed in the test environment 100.

In the example shown in FIG. 4, Instrument Write 419B is selected in the sequence of test steps in Test Explorer 410. Properties Explorer 420 display the properties of Instrument Write 412 test step including Name, Instrument, Type, Format, Command, Test Variable and Pause(s). In the example shown in FIG. 4, the properties of the Instrument Write 419B test step are specified as Instrument Write for Name, Serial-COM1 for Instrument, ASCII for Type, % s/n for Format, Command 1 for Command, Independent for Test Variable and 1 for Pause(s). One of skill in the art will appreciate that the properties of Instrument Write 419B test step shown in Properties Explorer 420 are illustrative and the properties of Instrument Write 419B test step may be different depending on the external devices 250 from which data is read and the data that is read from the external devices 250.

Figure 5:
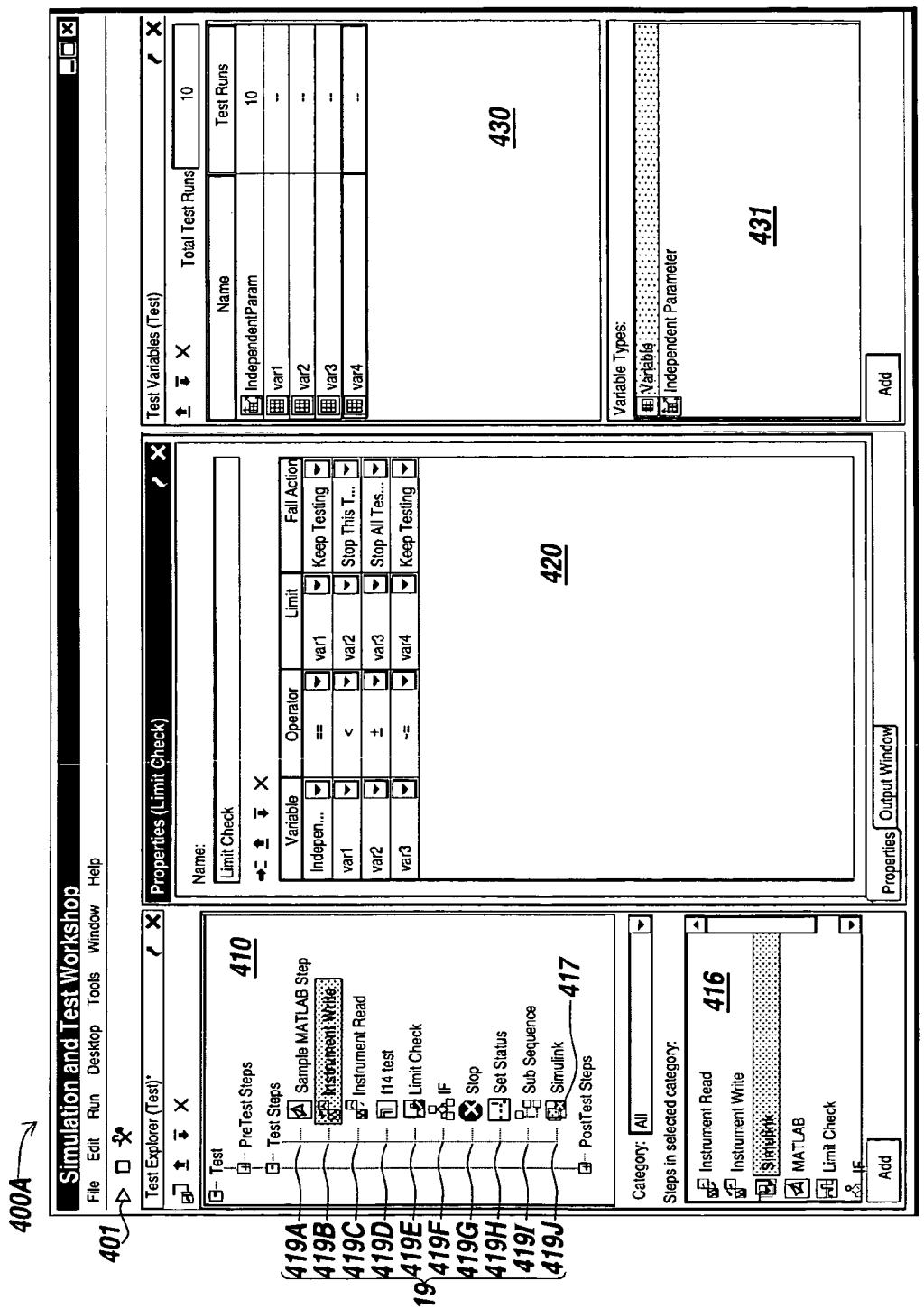

Referring back to FIG. 3B, the test manager 120 also enables the users to define the variables and parameters of the test using the graphical user interface (step 360). FIG. 5 provides a further example of a GUI 400B for defining the variables and parameters of the test. FIG. 5 illustrates a Limit Check 419E step selected from the sequence of test steps 419. This results in Properties Explorer 420 reflecting the properties of the Limit Check 419E step. As the nature of the step is different from the Instrument Write 419B step shown in FIG. 4, the properties differ. As shown in FIG. 5, entries for a Variable, an Operator, a Limit, and a Fail Action can be entered. Variable Explorer 430 portion of the graphical user interface 400B provides a summary of the test variables used in all variables used in the sequence of steps 419 of the test.

The properties of the selected test step may include variables the types of which should be specified in order for the selected test step to be executed in the test environment 100. The user interface includes Variable Explorer 430 that enables users to select the types of variables used in a selected test step. Variable Explorer 430 provides in a box 431 the variables provided in the test environment 100 so that the users may select one or more of the variables from the box 431 for inclusion in Properties Explorer 420 for a test step, as appropriate. In the examples shown in FIGS. 4 and 5, Variables and Independent Parameter are provided in the box 431, which may be initialized from the parse of the info.xml file described above with reference to FIG. 3A.

The independent parameters determine the parametric space or the number of test runs in order to complete the test steps. For example, if there is a single independent parameter with ten values, there will be ten test runs. If there are two independent parameters, the first independent parameter having five values and the second independent parameter having three values, there will be fifteen test runs to accomplish test steps having all possible combinations of the independent parameters.

On the selection of a test step, the test environment 100 examines the properties of the test step and determines whether the properties of the test step are specified to enable the test step to be executed in the test environment 100. If the test step is not executable in the test environment 100, Test Explorer 410 displays a graphical user interface element associated with the representation of the test step in the sequence of test steps. The graphical user interface element indicates that the test step is not executable in the test environment 100. In the examples shown in FIG. 4, an x-mark icon 417 is displayed associated with the representation of the Instrument Read 419C, f14 Test 419D, Limits Check 419E and Simulink® 419J test steps. FIG. 5 shows that the x-mark icon 417 is removed from all of the test steps, except for the Simulink® 419J test step.

If the test step is not executable in the test environment 100, Properties Explorer 420 may display the properties of the test step that should be specified for the selected test step to be executed in the test environment 100. Also, if a step is not executable, the play button 401 may be disabled when that test step is selected in Test Explorer 410. If the step is executable, the play button 401 is enabled.

Figure 6A:
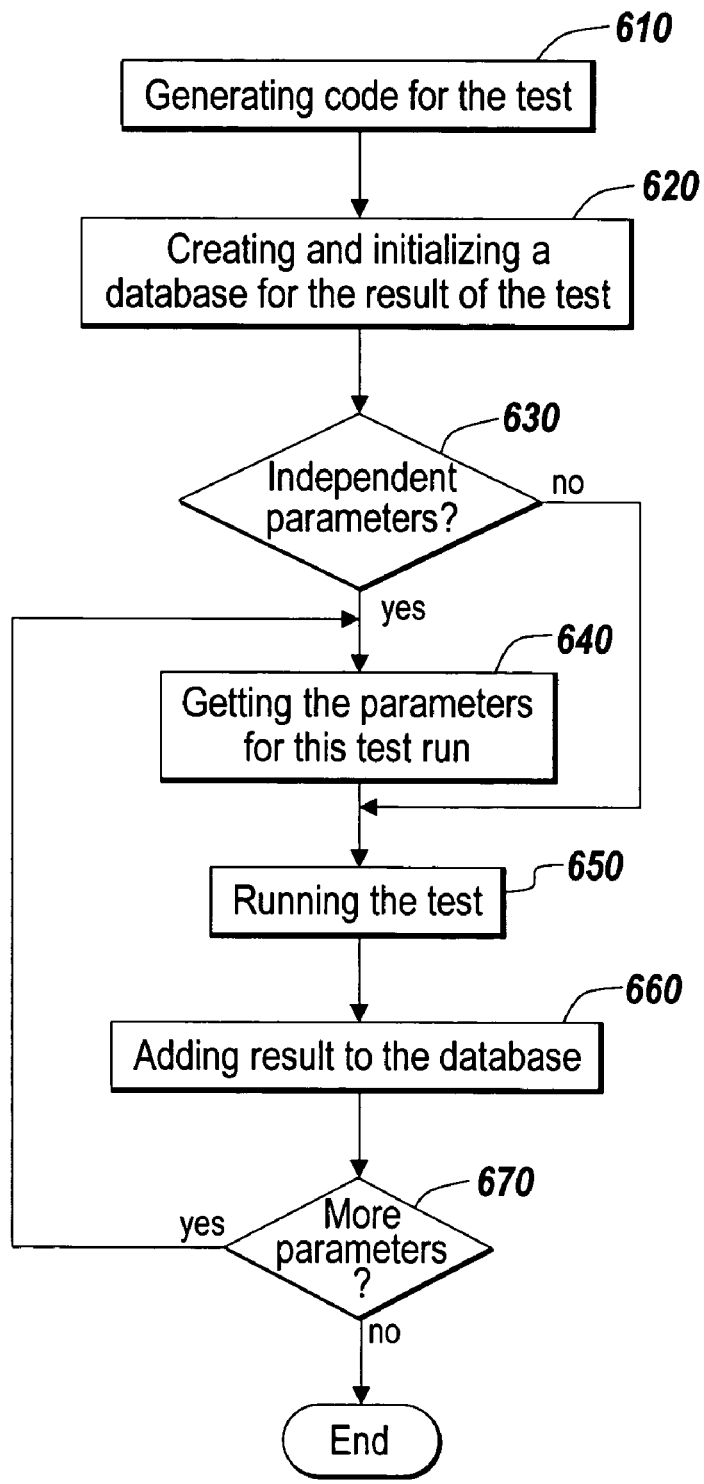
FIG. 6 is a flow chart illustrating an exemplary operation of the test manager for running the test.

Referring back to FIG. 3B, if the test is built in the test environment 100, the test manager 120 may run the test using the variables and parameters specified by the users (step 370). FIG. 6 is a flow chart illustrating an exemplary operation of the test manager 120 for running the test. If the users select to run the test, the test manager 120 automatically generates code for the test (step 610). When placed in the 'run' mode, the illustrative embodiment may dynamically create runnable MATLAB® M-code. Those of ordinary skill in the art will appreciate that although M-code is generated in the illustrative embodiment of the present invention, code for the test may be generated with different languages depending on the execution engine of the code in the test environment 100. The code for the test may be generated according to the configuration of the test steps and variables and parameters of the test specified by the users. The users may achieve their intended code by placing different test steps and variables in different locations in the test. The test manager 120 may include a predefined process 240 that orders the code. The process 240 may include a call for writing code for global variables in the test, a call for writing code for 'for' and 'while' segments, a call for writing code for local variables in the test, a call for writing main test code, a call for writing 'end' segments, etc. Each of the calls may happen within the process 240 and be recursive through all the test steps or variables in the test. Those of ordinary skill in the art will appreciate that these calls are illustrative and the process 240 may include different calls.

The code for the test can be run: locally as a single execution of the generated script; locally as multiple executions of the generated script over a range of user specified parameters; remotely and distributed among a cluster of machines as multiple executions of the generated script; and/or over a range of user specified parameters. For example, users may distribute the generated code to one or more remote computational devices to run the test. If the test is run in a distributed fashion, a self-containing object of the code for the test is distributed for the distributed execution of the test. The self-containing object may include all the necessary data, test procedures and result reporting mechanisms needed to execute the required steps for the user without the user needing to intervene. The code for the test may be distributed independently of operating systems using the ability of MATLAB® to run the same M-code on multiple operating systems. The illustrative embodiment of the present invention produces MATLAB® M-code in order to distribute and execute the test either on the current computational device 10 or in a distributed fashion. The illustrative embodiment may distribute test runs to multiple independent targets for arbitrarily parallel processing. The executable sequences, supporting files and models, and parametric data are distributed to each computational device to run the test. After each test run is complete, results may be sent to an archiving area where they are stored for future reference. In some test configurations, results from one test run may influence the data sent to a future test run, such as in an optimization sequence. In conjunction with code generation, the distribution of the generated code may be automatically performed. The user interface may display all test runs queued, running, and completed. Each test run displays a status and data associated with it. This interface can be configured to enable the user to stop or defer individual test runs or entire tests. Also, test results may be saved locally while running on different, remote computers.

Figure 6B:
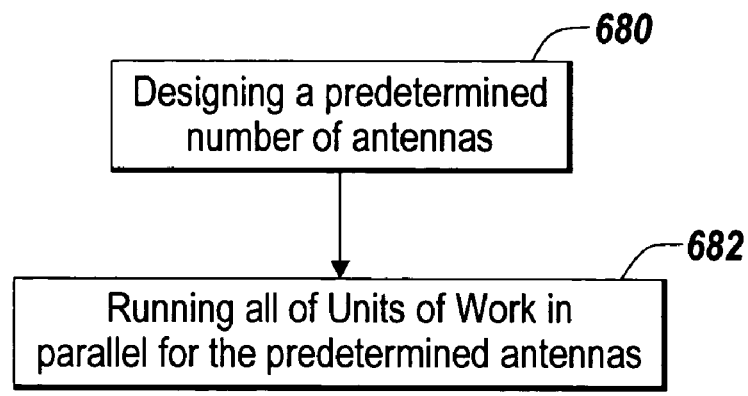

The distribution of the test is not limited to an "embarrassingly parallel" test and the test may be distributed as many at a time as possible. FIG. 6B shows an exemplary distribution of the test in the illustrative embodiment. It is assumed that users have a test that has 3 parameters A, B, and C of 10 values each (10*10=100 test runs per A value) where A is a system design parameter, and B and C are system environment parameters. It is also assumed that there are two test steps in the test including (1) designing the system and (2) exercising the system, then the users may parallelize the test several ways. As a first example, the users may design all 10 systems in parallel as 10 units of work (UoW) (step 680). After that, the users may run 1000 UoW in parallel for the 10 systems each with the 100 B and C parameter value combinations (step 682). The users may add 100 UoW at a time to the queue as each system design.

Figure 6C:
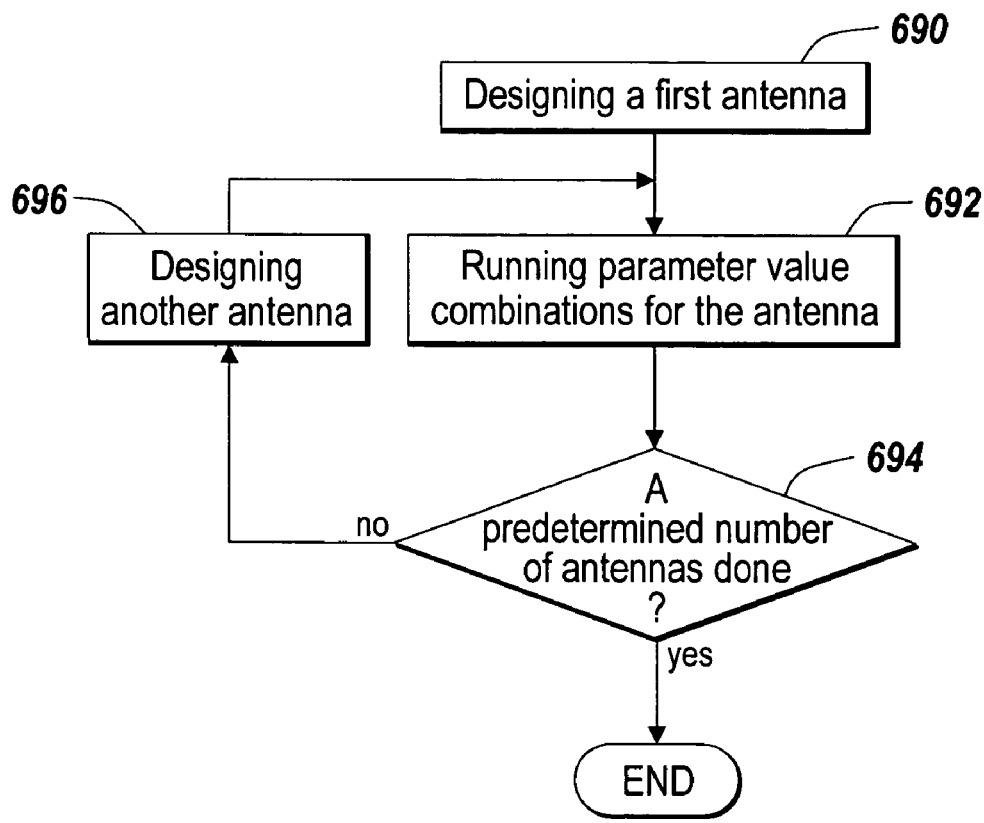

FIG. 6C shows another exemplary distribution of the test in the illustrative embodiment. As a second example, the users may design 1 system (step 690), and run 100 B and C parameter value combinations for the system (step 692). If a predetermined number of systems (for example, 10 antennas) are not designed and tested (step 694), the users may design another system (step 696), and run 100 B and C parameter combinations for the system. As a result, the illustrative embodiment of the present invention is not limited to an "embarrassingly parallel" test for the distribution method of the test, and may employ any distribution method that optimizes the distribution of a given test.

In the illustrative embodiment, the number of UoW may not be the same as the number of "test runs." For the above examples depicted in FIGS. 6B and 6C, there are 1000 "test runs", but there are 1010 UoW. This means that there is a hierarchy of multidimensional parametric spaces (HMPS), which will be described below in more detail. The HMPS could either be automatically inferred or directly specified in the test steps.

The test manager 120 also creates and initializes a dataset 260 for storing the result of running the test (step 620). In the illustrative embodiment, the dataset 260 is multidimensional and the size of the dataset 260 is determined by the independent parameters. For example, if there are two independent parameters, the dataset 260 may be thought of as a multi-layered column structure. The number of layers may correspond to the number of variables. Each column in the structure could be considered as a record, containing the independent parameter and variable values, both inputs and outputs for that test run. It is understood that more or less independent parameters may be used with the invention and the data structure format is not limited to a multi-layered column structure, regardless of the number of independent parameters.

It is checked whether there are independent parameters in the test (step 630). If there are independent parameters in the test, the test manager 120 obtains the parameters of the current test run (step 640). The illustrative embodiment provides a parametrically defined test space in which the test can be run with different parameters without a need for the users to generate code for each test run with different parameters. For example, by the use of the parametrically defined test space, a need to hand code multiple For Loops corresponding to the parameter space that is to be tested over may be avoided. The definition of the test can become independent of how the parameter is created and therefore the users can then change how the parameters created from a straight For Loop to more complex Monte Carlo method or design of experiment methods. Variable Explorer can be used to add variables of types such as an independent parameter. Independent parameters are a subclass of variable and add the capability of having the test iterate over all the possible combinations of values of independent variables. For example, according to the illustrative embodiment, if there is a single independent parameter that has ten values, there may be ten test runs. If there are three independent parameters, one with three values, a second with six values and a third with four values, there may be 72 test runs (3×6×4). Optionally, independent parameters can be subclassed further, such as by using a Monte Carlo method or other methods.

The generated code for the test is executed using the variables and parameters corresponding to the current test run (step 650). In the execution of the code for the test, automatic parameter mapping may be provided. Users may specify parameters that may vary over multiple executions of the generated code. When placed in the 'run' mode, the parameters are dynamically assigned to the function calls of the code when it is run. The test can be run over various ranges of conditions that may be specified in a parameter sweep. Test runs recursively call all of the generated M-code methods using a command design pattern.

When the current test run is completed, the output data of the current test run is added to the dataset 260 for storing the output data of the test (step 660). The data added to the dataset 260 in each test run must be named and marked for saving before running the test. The variable may optionally be marked for saving on disk with a reference stored in the dataset Output Window depicted in FIG. 2C may receive message published from running the test and displays the status and data of running the test. The user may be allowed to interactively construct the content of the dataset 260 using Output Window. For example, format details, such as normal text headers, limit check and requirements output, may be integrated with live graphical data as the test is run. Output Window may display live graphical data as a test is run. The Output Window data may be saved as a report at the conclusion of the test.

If there are remaining parameters (step 670), the test manager 120 repeats steps 640-660 with new parameters. The illustrative embodiment of the present invention saves the result of the test in the dataset 260 integrated with the test environment 100 (step 380 in FIG. 3B). The dataset 260 may include metadata of the input data. The dataset 260 may be multidimensional depending on the variables and parameters of the test specified by the users. The illustrative embodiment may also provide integrated hierarchical data storage. The multidimensional dataset 260 may be stored in memory in a binary or textual hierarchical structure. The data can be bound to group together input parameter vectors, scalar output data, and complex output data. Each point in the parametric space can have an arbitrary number of named scalar and nonscalar results associated with it. Small scalar data may be stored in the dataset 260 itself. This dataset 260 may be held in memory for fast access. A result space could also contain large data for each test point, such as simulation result vectors or acquired data consisting of gigabytes of data. Since there could be millions of test points, all data may not be held in memory at once. Every point in the result space may contain a reference to one or more information storage and retrieval systems which contain complex data. The specific instance of the reference may include pointers, handles, textual names, URLs, iconic or graphical representations, etc. The information storage and retrieval systems may include files, databases, reflective moon-bounce storage delay storage, etc. These information storage and retrieval systems may be loaded one at a time as the data inside them is requested.

Referring back to FIG. 3B, the illustrative embodiment of the present invention can provide a wide variety of options for viewing the result of the test (step 390). Classes of data may be used to locate an appropriate associated Viewer. Also, by use of the illustrative embodiment with MATLAB® an ability to have integrated visualization directly accessible in the test and for viewing post test data is provided. The visualization may be automatically provided at the end of the test if desired. Conversely, conventional test executive environments often require the user to use a different product to do visualization and do not typically provide the necessary hooks for this to happen automatically. One example of data visualization is shown in the graph window 700 shown by way of example in FIG. 7.

The illustrative embodiment can include a visualization environment designed for viewing and understanding the dataset 260 generated. Some visualization environments deal with grouped vectors of columnar information. The illustrative embodiment's visualization tools operate upon higher-order N-dimensional data, aiding in surface or volumetric plots. This enables a 2-d plane or 3-d cube of data to be extracted from a 6-dimensional set of data and displayed in a meaningful fashion. In addition, individual points in the multidimensional space may contain complex, nonscalar data. The illustrative embodiment can also isolate and display this information. For example, one point in test space may contain several vectors of information. Any or all of these could be plotted against each other.

Each visualization type can declare a set of information such as plotting command and number/dimensionality of inputs. These schemas can facilitate selection of which data to plot. Although default plot types may be provided, users may also define their own plot types.

It is often possible but confusing to visualize more than three spatial dimensions at a time. The visualization environment of the illustrative embodiment can plot a subset of the available data in order to make the overall results more comprehensible. For example, a 3-dimensional cube of data result could be sliced at a specified value of one of its independent axes to produce a 2-dimensional plane of data more suitable for plotting. This process can be extended to arbitrarily many dimensions.

According to the illustrative embodiment, dimensionality reduction need not be singular. By defining multiple slice axes, multiple lower-dimensionality views of the N-dimensional data can be extracted and displayed simultaneously. An interactive legend may map each plot to its associated slice value. Multiple dimensions may be sliced in this manner, displaying all combinations of the selected values.

In summary, the illustrative embodiment of the present invention provides an integrated test environment 100 for testing various types of units under test 130. The test environment 100 may test the programs generated in both textual and graphical programming and/or modeling tools. The test environment 100 may also test the functions provided by the units under test 130, such as interfacing with external devices to transfer data from/to the external devices. One of skill in the art will appreciate that the functions tested in the test environment 100 are not limited to interfacing of the computational devices, but rather include any other functions performed by the units under test 130. The test environment 100 may further test data, such as the limit values of the data. The data may be obtained from the external devices or generated by the execution of the programs. One of skill in the art will appreciate that the programs, data, functions are illustrative objects tested in the test environment 100 and the test environment 100 may test other units under test, such as units under test relating to the hardware of computational devices.

The present invention has been described by way of example, and modifications and variations of the described embodiments will suggest themselves to skilled artisans in this field without departing from the spirit of the invention. Aspects and characteristics of the above-described embodiments may be used in combination. The described embodiments are merely illustrative and should not be considered restrictive in any way. The scope of the invention is to be measured by the appended claims, rather than the preceding description, and all variations and equivalents that fall within the range of the claims are intended to be embraced therein.

We claim:

1. In a computational device providing a test environment, a method for conducting a test for testing units under test, the method comprising:

enabling users to edit the test to include a sequence of one or more test steps for testing the units under test, each of the one or more test steps being of a type selected from a group consisting of a test step for testing a textual program, a test step for testing a graphical program, a test step for testing a function provided in a software tool and a test step for testing a hardware device;

enabling the users to edit one or more independent parameters, an independent parameter defining a dimension of a parametric space, the parametric space including a plurality of points;

generating code for the test; and automatically executing the code using defined values of the one or more independent parameters to produce output data from a number of executions of the test, elements of the output data corresponding to the plurality of points of the parametric space of the one or more independent parameters, wherein automatically executing comprises:

using at least two independent parameters to execute the code, wherein at least one of the at least two used independent parameters has a plurality of defined values, determining the number of executions of the test by multiplying the defined values in each of the at least two used independent parameters;

initializing a multidimensional parametric space for storing the output data generated from the number of executions of the test, dimensions of the multidimensional parametric space representing and corresponding to a product of the defined values in each of the at least two used independent parameters, and adding the output data to the multidimensional parametric space.

2. The method of claim 1, wherein the enabling the users to edit the test further comprises:

determining test steps installed in the computational device; and enabling the users to select the one or more test steps for the test from the test steps installed in the computational device.

3. The method of claim 1, wherein the enabling the users to edit the one or more independent parameters further comprises:

determining variables installed in the computational device; and enabling the users to select one or more variables for the test from the variables installed in the computational device so that the users are able to specify variables and parameters of the test.

4. The method of claim 1, wherein the enabling the users to edit the test further comprises:

enabling the users to add new software tools to the test environment.

5. The method of claim 1, wherein the executing further comprises:

distributing at least a portion of the code for the test to one or more remote computational devices for a distributed execution of the code.

6. The method of claim 5, wherein the distributing comprises:

distributing all portions of the test at a time to one or more remote computational devices for a distributed execution of the test; and enabling the all portions of the test to be run in parallel in the one or more remote computational devices.

7. The method of claim 5, wherein the distributing comprises:

(a) distributing a portion of the test at a time to one or more remote computational devices;

(b) enabling the distributed portion of the test to be run in parallel; and (c) repeating (a) and (b) steps until all portions of the test are distributed and run in parallel.

8. The method of claim 1, wherein the executing comprises:

obtaining parameters for a current execution of the test.

9. The method of claim 8, wherein the executing comprises:

determining whether there is a remaining execution of the test; and obtaining parameters for a next execution of the test.

10. The method of claim 1, further comprising:

storing the output data of the number of executions of the test in the multidimensional parametric space.

11. The method of claim 10, wherein the multidimensional parametric space stores metadata of the output data of the number of executions of the test.

12. The method of claim 10, wherein the output data of the number of executions of the test in the multidimensional parametric space is stored in memory in a binary or textual hierarchical data structure.

13. The method of claim 10, wherein each point in the multidimensional parametric space comprises a reference to one or more information storage and retrieval systems that contain data, the one or more information storage and retrieval systems being loaded one at a time as the data in the one or more information storage and retrieval systems is requested.

14. The method of claim 13, wherein the one or more information storage and retrieval systems comprises a multi-level hierarchical storage.

15. The method of claim 10, wherein the multidimensional parametric space is integrated in the testing environment.

16. The method of claim 10, further comprising:

providing a graphical display of the output data stored in the multidimensional parametric space.

17. The method of claim 16, wherein the graphical display is automatically generated based on data generated by the testing environment.

18. The method of claim 16, wherein the graphical display displays multi-dimensional data.

19. The method of claim 1, wherein the units under test comprise at least one of a graphical program, a textual program, a function provided in a software tool, and a hardware device.

20. A computer-implemented system for conducting a test for testing units under test, the system comprising:

a display; and a processor configured to provide a user interface on the display for users to edit the test to include a plurality of test steps for testing the units under test, the test including a sequence of at least a first test step and a second test step, the second step being of a different type than the first test step, the first test step and the second test step being of types selected from a group consisting of a test step for testing a textual program, a test step for testing a graphical program, a test step for testing a function provided in a software tool and a test step for testing a hardware device;

enable the user to edit one or more independent parameters, an independent parameter defining a dimension of a parametric space, the parametric space including a plurality of points;

generate code for the test; and execute the code using defined values of the one or more independent parameters to generate output data from a number of executions of test, elements of the output data corresponding to the plurality of points of the parametric space of the one or more independent parameters, wherein execute the code comprising:

use at least two independent parameters to execute the code, wherein at least one of the at least two used independent parameters has a plurality of defined values, determine the number of executions of the test by multiplying the defined values in each of the at least two used independent parameters;

initialize a multidimensional parametric space for storing the output data generated from the number of executions of the test, dimensions of the multidimensional parametric space representing and corresponding to a product of the defined values in each of the at least two used independent parameters, and add the output data to the multidimensional parametric space.

21. The system of claim 20, wherein the user interface enables the users to select the plurality of test steps for the test so that the users are able to edit the sequence of the test steps in the test.

22. The system of claim 20, wherein the user interface enables the users to select one or more variables for the test so that the users are able to specify variables and parameters of the test.

23. The system of claim 20, wherein the processor is further configured to enable the users to add new software tools to the test environment.

24. The system of claim 20, wherein the code for the test is executed locally with the user interface.

25. The system of claim 20, wherein the code for the test is executed remotely from the user interface.

26. The system of claim 20, wherein the processor is further configured to store the output data of the test as a multidimensional dataset in the test environment.

27. The system of claim 26, wherein the multidimensional dataset comprises metadata of the output data of the test.

28. The system of claim 26, wherein the multidimensional dataset is stored in memory in a binary or textual hierarchical data structure.

29. The system of claim 26, wherein each point in the multidimensional dataset comprises a reference to one or more information storage and retrieval systems that contain data, the one or more information storage and retrieval systems being loaded one at a time as the data in the one or more information storage and retrieval systems is requested.

30. The system of claim 29, wherein the one or more information storage and retrieval systems comprises a multi-level hierarchical storage.

31. The system of claim 26, wherein a dimension of the multidimensional dataset is defined by a number of elements of an independent parameter contained by the test.

32. The system of claim 26, further comprising:
a viewer for displaying the output data stored in the multidimensional dataset.

33. The system of claim 20, wherein the units under test comprise at least one of a graphical program, a textual program, a function call provided in a software tool, and a hardware device.

34. A system for providing a test environment in a computational device, the system comprising:
storage; and
a processor configured to:
provide a first user interface for users to edit a test to include a sequence of one or more test steps for testing units under test, each of the one or more test steps being of a type selected from a group consisting of a test step for testing a textual program, a test step for testing a graphical program, a test step for testing a function provided in a software tool and a test step for testing a hardware device;
provide a second user interface for the users to edit one or more independent parameters, an independent parameter defining a dimension of a parametric space, the parametric space including a plurality of points;
generate code for the test;
automatically execute the code using defined values of the one or more independent parameters to produce output data from a number of executions of the test, elements of the output data corresponding to the plurality of points of the parametric space of the one or more independent parameters, wherein automatically execute comprises:
use at least two independent parameters to execute the code, wherein at least one of the at least two used independent parameters has a plurality of defined values,
determine the number of executions of the test by multiplying the defined values in each of the at least two used independent parameters;
initialize a multidimensional parametric space for storing the output data generated from the number of executions of the test, dimensions of the multidimensional parametric space representing and corresponding to a product of the defined values in each of the at least two used independent parameters,
add the output data to the multidimensional parametric space, and
store the output data as a multidimensional dataset in the storage, elements of the multidimensional dataset corresponding to the plurality of points of the parametric space in the at least two used independent parameters.

35. The system of claim 34, wherein the multidimensional dataset comprises metadata of the output data of the test.

36. The system of claim 34, wherein the multidimensional dataset is stored in memory in a binary or textual hierarchical data structure.

37. The system of claim 34, wherein each point in the multidimensional dataset comprises a reference to one or more information storage and retrieval systems that contain data, the one or more information storage and retrieval systems being loaded one at a time when the data in the one or more information storage and retrieval systems is requested.

38. The system of claim 37, wherein the one or more information storage and retrieval systems comprises multi-level hierarchical storage.

39. The system of claim 34, wherein the first user interface enables the users to select the plurality of test steps for the test from test steps installed in the computational device so that the users are able to edit a sequence of the test steps in the test.

40. The system of claim 34, wherein the second user interface enables the users to select one or more variables for the test from variables installed in the computational device so that the users are able to specify variables and parameters of the test.

41. The system of claim 34, further comprising:
an application program interface for enabling the users to add new software tools to the test environment.

42. The system of claim 34, further comprising:
a viewer for displaying the output data stored in the multidimensional dataset.

43. The system of claim 34, wherein the units under test comprise at least one of a graphical program, a textual program, a function call provided in a software tool, and a hardware device.

44. A computer-readable storage medium holding computational device executable instructions for conducting a test for testing units under test, the medium comprising:
instructions for enabling users to edit the test to include a sequence of one or more test steps for testing the units under test, each of the one or more test steps being of a type selected from a group consisting of a test step for testing a textual program, a test step for testing a graphical program, a test step for testing a function provided in a software tool and a test step for testing a hardware device;

instructions for enabling the users to edit one or more independent parameters, an independent parameter defining a dimension of a parametric space, the parametric space including a plurality of points;

instructions for generating code for the test; and instructions for automatically executing the code using defined values of the one or more independent parameters to generate output data from a number of executions of the test, elements of the output data corresponding to the plurality of points of the parametric space of the one or more independent parameters, wherein the instructions for automatically executing comprises:

instructions for using at least two independent parameters to execute the code, wherein at least one of the at least two used independent parameters has a plurality of defined values, instructions for determining the number of executions of the test by multiplying the defined values in each of the at least two used independent parameters;

instructions for initializing a multidimensional parametric space for storing the output data generated from the number of executions of the test, dimensions of the multidimensional parametric space representing and corresponding to a product of the defined values in each of the at least two used independents, and instruction for adding the output data to the multidimensional parametric space.

45. The medium of claim 44, wherein the instructions for enabling the users to edit the test further comprises:

instructions for determining test steps installed in the computational device; and instructions for enabling the users to select the one or more test steps for the test from the test steps installed in the computational device.

46. The medium of claim 44, wherein the instructions for enabling the users to edit the one or more independent parameters further comprises:

instructions for determining variables installed in the computational device; and instructions for enabling the users to select one or more variables for the test from the variables installed in the computational device so that the users are able to specify variables and parameters of the test.

47. The medium of claim 44, wherein the instructions for enabling the users to edit the test further comprises:

instructions for determining software tools installed in the computational device; and instructions for enabling the users to add new software tools to the test environment.

48. The medium of claim 44, wherein the instructions for executing further comprises:

instructions for distributing at least a portion of the code for the test to one or more remote computational devices for a distributed execution of the code.

49. The medium of claim 48, wherein the instructions for distributing comprises:

instructions for distributing all portions of the test at a time to one or more remote computational devices for a distributed execution of the test; and instructions for enabling the all portions of the test to be run in parallel in the one or more remote computational devices.

50. The medium of claim 48, wherein the instructions for distributing comprises:

instructions for (a1) distributing a portion of the test at a time to one or more remote computational devices;

instructions for (b1) enabling the distributed portion of the test to be run in parallel; and instructions for repeating (a1) and (b1) until all portions of the test are distributed and run in parallel.

51. The medium of claim 44, wherein the instructions for executing comprises:

instructions for obtaining parameters for a current execution of the test.

52. The medium of claim 51, wherein the instructions for executing comprises:

instructions for determining whether there is a remaining execution of the test; and instructions for obtaining parameters for a next execution of the test.

53. The medium of claim 44, further comprising:

instructions for storing the output data of the number of executions of the test in the multidimensional parametric space.

54. The medium of claim 53, wherein the multidimensional parametric space stores metadata of the output data of the number of executions of the test.

55. The medium of claim 53, wherein the multidimensional parametric space is stored in memory in a binary or textual hierarchical data structure.

56. The medium of claim 53, wherein each point in the multidimensional parametric space comprises a reference to one or more information storage and retrieval systems that contain data, the one or more information storage and retrieval systems being loaded one at a time as the data in the one or more information storage and retrieval systems is requested.

57. The medium of claim 56, wherein the one or more information storage and retrieval systems comprises a multi-level hierarchical storage.

58. The medium of claim 53, wherein the multidimensional parametric space is integrated with the testing environment.

59. The medium of claim 53, further comprising:

instructions for providing a graphical display of the output data stored in the multidimensional parametric space.

60. The medium of claim 59, wherein the graphical display is automatically generated based on data generated by the testing environment.

61. The medium of claim 59, wherein the graphical display displays multi-dimensional data.

62. The medium of claim 44, wherein the units under test comprise at least one of a graphical program, a textual program, a function provided in a software tool, and a hardware device.

* * * * *

UNITED STATES PATENT AND TRADEMARK OFFICE
CERTIFICATE OF CORRECTION

PATENT NO. : 7,610,578 B1
APPLICATION NO. : 10/925413
DATED : October 27, 2009
INVENTOR(S) : Greg Taillefer et al.

Page 1 of 1

It is certified that error appears in the above-identified patent and that said Letters Patent is hereby corrected as shown below:

On the Title Page, at Item (73) Assignee, replace "The Math Works, Inc." with
--The MathWorks, Inc.--.

Signed and Sealed this
Eighteenth Day of November, 2014

Michelle K. Lee
*Deputy Director of the United States Patent and Trademark Office*